United States Patent [19]

Stolecki

[11] 4,294,472
[45] Oct. 13, 1981

[54] PIPE COUPLING ASSEMBLY ESPECIALLY SUITABLE FOR USE IN THE NUCLEAR REACTOR

[75] Inventor: William E. Stolecki, East Longmeadow, Mass.

[73] Assignee: Electric Power Research Institute, Palo Alto, Calif.

[21] Appl. No.: 51,805

[22] Filed: Jun. 25, 1979

[51] Int. Cl.³ .............................................. F16L 27/04
[52] U.S. Cl. ..................................... 285/27; 285/165; 285/166; 285/261
[58] Field of Search ............... 285/165, 166, 261, 233, 285/11, 10, 27, 24

[56] References Cited

U.S. PATENT DOCUMENTS

| | | | |
|---|---|---|---|
| 1,155,240 | 9/1915 | Jeffrey | 285/261 X |
| 2,564,938 | 8/1951 | Warren | 285/261 X |
| 2,956,820 | 10/1960 | De Cenzo | 285/233 X |
| 3,154,328 | 10/1964 | Masse | 285/233 |
| 3,173,710 | 3/1965 | Kinnison | 285/166 X |
| 3,304,104 | 2/1967 | Wiltse | 285/27 X |
| 3,404,904 | 10/1968 | Roe | 285/165 |
| 3,433,504 | 3/1969 | Hanes | 285/166 X |
| 3,695,645 | 10/1972 | Mommsen | 285/261 |
| 3,695,646 | 10/1972 | Mommsen | 285/261 |
| 4,087,323 | 5/1978 | Sullivan et al. | 285/268 X |

Primary Examiner—Thomas F. Callaghan
Attorney, Agent, or Firm—Flehr, Hohbach, Test

[57] ABSTRACT

An all metal pipe coupling assembly especially suitable for fluid connecting together certain components submerged within liquid metal in a pool type nuclear reactor is disclosed herein. This coupling assembly which is also submerged within the pool of liquid metal connects the reactor components together using three tubular sections and two joint arrangements which eliminate thermal expansion stresses. The joint arrangements also maintain low seismic stresses and are pressure energized to minimize leakage.

12 Claims, 4 Drawing Figures

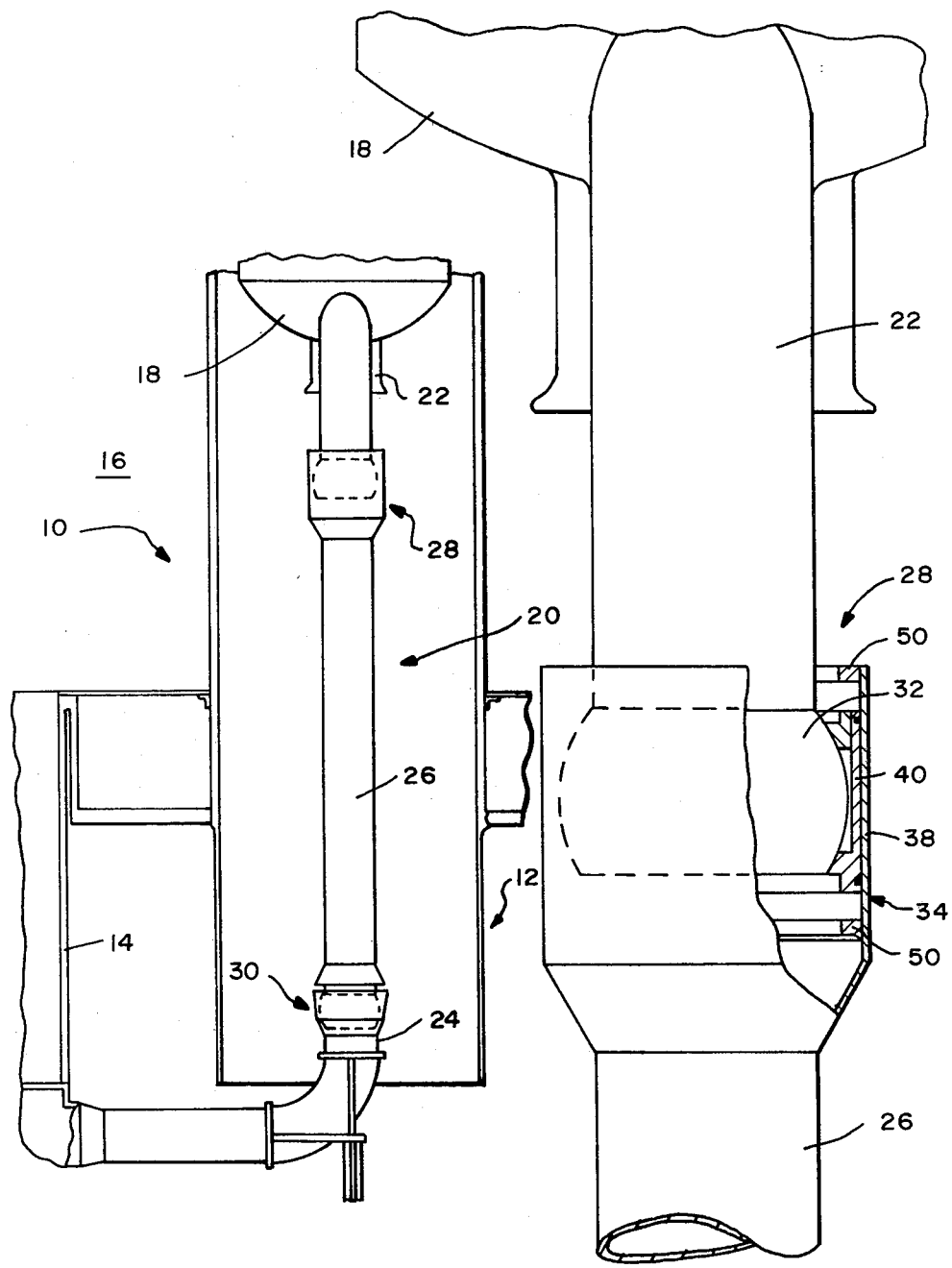
FIG.—1
FIG.—2

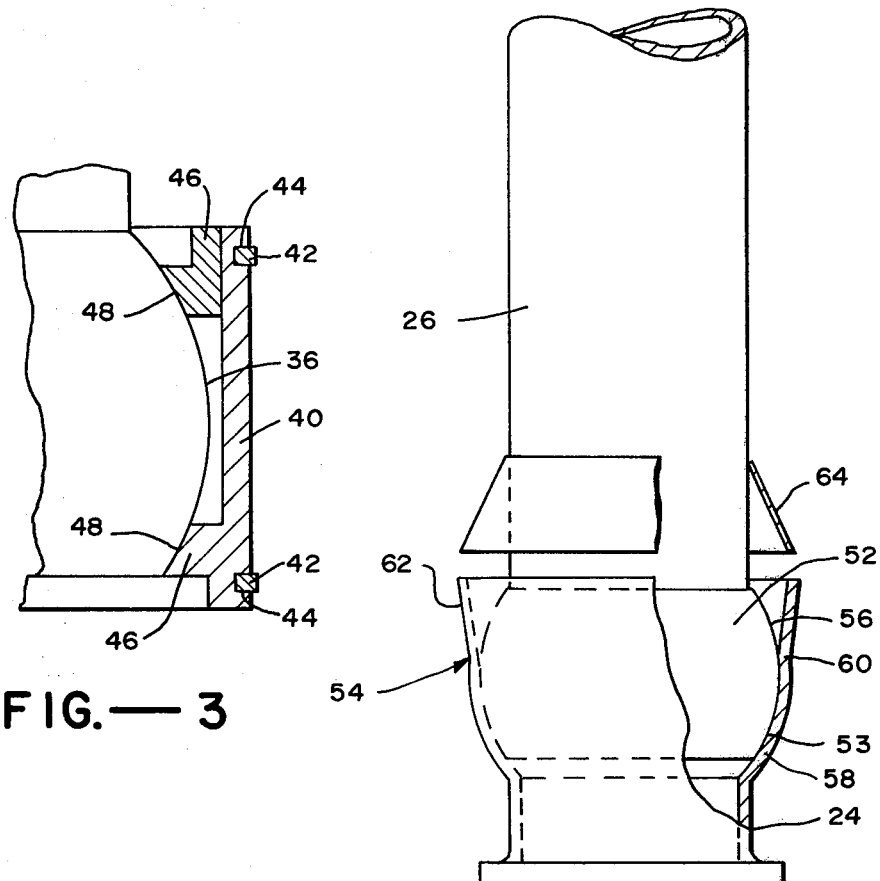
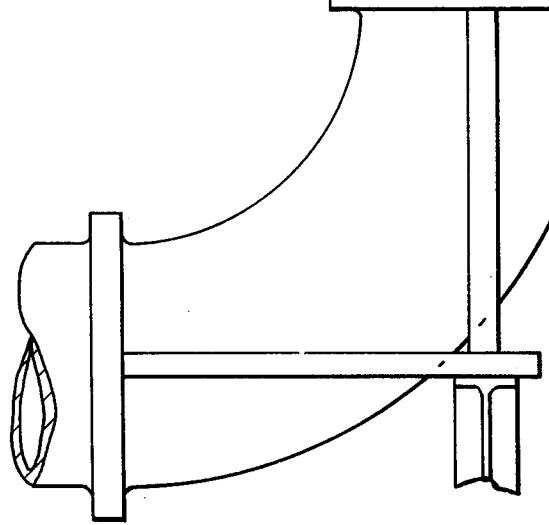
FIG.—3
FIG.—4

PIPE COUPLING ASSEMBLY ESPECIALLY SUITABLE FOR USE IN THE NUCLEAR REACTOR

The present invention relates generally to pipe coupling assemblies and more particularly to an all metal pipe coupling assembly especially suitable for fluid connecting together certain components submerged within a pool of liquid metal in a nuclear reactor such as a pool type liquid metal fast breeder reactor (LMFBR).

In reactors of the type just recited, there is a need for primary pipe with very low stresses from thermal expansion and seismic loading. This is because such piping is generally inaccessible for in-service inspection when submerged in the liquid metal pool. One approach is attempting to satisfy this need is described in U.S. Pat. No. 4,087,323 which discloses an expansion joint device or pipe coupling utilizing two rotating joints slidably mounted together. Unfortunately, that coupling is similar to a bellows in that it tends to increase seismic stresses when it is incorporated in a pipe run. In addition, the coupling uses a single spring for sealing the joint. As a result, the force exerted on the joints is constant and does not increase with increasing fluid pressure. Finally, the pipe coupling disclosed in this patent is not an integral part of the piping itself or otherwise interlocked with the latter and hence cannot be readily removed with the piping for inservice inspection.

Another approach in attempting to compensate for joint movement may be found in a joint provided by Aeroquip Corporation under the name BARCO joint. This joint uses a female coupling for connecting together spherical male ends of two pipes. In this way, each connected pipe end is free to pivot relative to the coupling, thereby compensating for joint movement. This joint does not, however, provide axial movement as in the case of the patent described above.

As will be seen hereinafter, the pipe coupling assembly disclosed herein is one which not only eliminates thermal expansion stresses, but also may be designed to maintain low seismic stresses. Moreover, as will also be seen, this pipe coupling is pressure energized, that is, responsive to increases in internal fluid pressure for exerting increased sealing forces to its joints. Also, it is readily removed at least in part with the piping for inservice inspection.

In view of the foregoing, one object of the present invention is to provide an uncomplicated and yet reliable pipe coupling assembly especially suitable for fluid connecting together certain components, that is, for connecting components for passage of fluid therebetween, which, components are submerged within a pool of liquid metal in a nuclear reactor such as a pool type LMFBR.

A more particular object of the present invention is to provide a pipe coupling assembly of the type just recited which eliminates thermal expansion stresses while maintaining low seismic stresses.

Another object of the present invention is to provide a pipe coupling assembly which is responsive to increased internal fluid pressure for providing increased sealing forces to its joints.

Still another particular object of the present invention is to provide a pipe coupling assembly which is designed so that most of its components can be readily removed with connecting piping for inspection.

In accordance with the present invention, the pipe coupling assembly disclosed herein is all metal and includes three tubular sections, a first section adapted for connection with one of the reactor components, a second section adapted for connection with another of the reactor components, and a third intermediate tubular section for interconnecting the other two. The pipe assembly also includes first and second joint arrangements for respectively connecting one end of the intermediate section with an adjoining end of the first section and the opposite end of the intermediate section with an adjoining end of the second section.

The first joint arrangement just recited forms the connecting ends of the first and intermediate tubular sections and includes a male portion having an outer partially spherical contour, an associated female portion including means supporting the male portion for limited axial and pivotal movement, and means for interlocking the male and female portions together. The second arrangement forms the connecting ends of the second and intermediate tubular sections and includes a male portion having an outer partially spherical contour and an associated female portion including means supporting its associated male portion for limited pivotal movement.

FIG. 1 is an elevational view diagrammatically illustrating pertinent parts of a pool type LMFBR including a pipe coupling assembly designed in accordance with the present invention.

FIG. 2 is an enlarged elevational view, partially in section, showing one joint arrangement comprising part of the overall pipe coupling assembly illustrated in FIG. 1.

FIG. 3 is an enlarged sectional view illustrating certain aspects of the joint shown in FIG. 2. FIG. 4 is an enlarged elevational view, partially in section, showing a second joint arrangement comprising part of the overall pipe coupling assembly illustrated in FIG. 1.

Turning now to the drawings, wherein like components are designated by like references numerals throughout the various figures, attention is specifically directed to FIG. 1 which illustrates certain components in a pool type liquid metal fast breeder reactor generally designated by the reference numeral 10. As shown, the reactor includes an overall vessel 12 containing an active core 14 which is submerged in a pool 16 of a liquid metal, specifically liquid sodium. The reactor is also shown including a pump 18 provided for circulating a stream of the liquid sodium through the reactor for cooling the latter and, hence, requires a suitable plumbing in order to accomplish this. As will be seen hereinafter, this plumbing includes an all metal pipe coupling assembly 20 which, like the reactor core 14 and pump 18, is submerged within sodium pool 16 and which is designed in accordance with the present invention.

All of the reactor components thus far recited, with the exception of assembly 20, are conventional and, therefore, will not be described herein. In this regard, it is to be understood that the reactor also includes other conventional components such as a conventional internal heat exchanger, an upper instrumentation section or instrument tree as it is more commonly called and other components. For purposes of the present invention, it is important only to re-emphasize that assembly 20 is entirely submerged within sodium pool 16 and, hence, relatively inaccessible for in-service inspection while submerged. In addition, it is important to note that the pump 18 may vary during operation resulting in fluctuations in the flow rate of sodium through pipe assembly 20 and, hence, pressure within the assembly. For all of these reasons, it is important to provide a pipe coupling assembly (1) that eliminates thermal expansion stresses while maintaining low seismic stresses, (2) that is responsive to changes in internal pressure, and (3) that can be readily removed from the pool of sodium (at least in part) for inspection. As will be seen, pipe coupling assembly 20 provides these advantages.

As illustrated in FIG. 1, assembly 20 includes three tubular pipe sections, a top section 22 serving as discharge piping for pump 18, a bottom tubular section 24 serving as part of an overall coupling to the reactor core 14 and an intermediate tubular section 26 interconnecting top section 22 with bottom section 24. In order to make this connection, assembly 20 also includes a first or top joint arrangement 28 which is best seen in FIGS. 2 and 3 and a second or bottom joint arrangement 30 which is best seen in FIG. 4. Top arrangement 28 is provided for connecting the adjacent ends of tubular sections 22 and 26 while bottom arrangement 30 serves to connect the adjacent ends of tubular sections 24 and 26.

Referring now to FIG. 2, it can be seen that joint arrangement 28 actually forms the connecting ends of tubular sections 22 and 26. More specifically, the connected end of section 22 is comprised of a male portion 32 of the joint arrangement while the connected end of tubular section 26 is comprised of a female portion 34 of the joint arrangement. Male portion 32 defines a partially spherical outer contour 36 (FIG. 3) having a maximum outer diameter for the overall length of tubular section 22. As will be seen below, female portion 34 includes a number of components designed to interconnect with the male portion for providing limited axial and pivotal movement between the male and female portions and for interlocking the two together.

As seen in FIGS. 2 and 3, female portion 34 of joint arrangement 28 includes an enlarged outer cylindrical housing 38 and a concentric inner cylindrical sleeve 40 which is shorter in length than the outer housing and which is slidable within and against the inner surface of the latter, along a longitudinal section thereof. A pair of expansion or piston rings are disposed within and extend partially outside two longitudinally spaced, annular grooves 44 in the outer surface of inner sleeve 40 and serve to provide a seal between the outer housing and inner sleeve. Inner sleeve 40 also includes a pair of longitudinally spaced, inwardly extending annular flanges 46, each of which includes a bearing surface 48 conforming in shape to and engaged slidably against spherical contour 36 of male joint portion 32. Both of these flanges may be separate and distinct components welded or otherwise suitably joined to the sleeve's inner surface or, as shown in FIG. 3, only the uppermost flange may be a separate and distinct component whereas the lowermost flange may be formed as in integral part of the sleeve. This is because the lower flange may form part of the inner sleeve before assembly with male portion 32 whereas the upper (outermost) flange cannot be connected with the inner sleeve until after assembly.

From the foregoing, it should be apparent that the interaction between outer housing 38 and inner sleeve 40 serves to support male portion 32 and the rest of the tubular section 22 for axial movement relative to the female portion 38 and the rest of tubular section 26. At the same time, the interaction between flanges 46 of inner sleeve 40 and the outer contour 36 of male portion 32 serves to support the male portion and the rest of section 22 for pivotal movement relative to the female portion and tubular section 26. In actual practice of course, tubular section 26 will in most cases move axially and pivot relative to section 22. In either case, in order to limit the relative axial movement between the male and female portions of the joint arrangement, outer housing 38 includes a pair of annular stop flanges 50 connected to and extending inwardly from its inner surface on opposite sides of the inner sleeve 40. In addition, the upper or outermost stop flange 50 serves to interlock the two joint portions together and hence the two tubular sections 22 and 26. This flange cannot be provided at least until the inner sleeve is assembled within housing 38 and hence cannot be formed integrally therewith. However, the inner stop flange can be integrally formed with the housing.

At this time, it should be noted that the pivoting feature of joint arrangement 28 is similar to the pivoting action between the spherical male end and female coupling end of the BARCO joint described previously. However, this is where any similarities end since this latter joint does not provide the axial movement made possible by the cooperation of male portion 32 and sleeve 40 just described. Moreover, the BARCO joint does not include any arrangement even remotely similar to joint arrangement 30 to be described below.

Referring now to FIG. 4, attention is directed to joint arrangement 30 which includes a male portion 52 forming the lowermost end of tubular section 26 and a female portion 54 forming the adjoining end of tubular section 24. Male portion 52 is similar to previously described male portion 32 to the extent that it is larger in diameter than its adjoining tubular section, and to the extent it includes an outer surface 56 which is spherical in contour. As will be seen below, male portion 52 is supported within the female portion for pivotal movement and a limited degree of axial movement relative to the female portion.

Female portion 54 of joint arrangement 30 includes three longitudinally spaced segments, a lowermost segment 58, an intermediate segment 60 and an uppermost entry segment 62. Segment 58 includes an inner surface 53 which conforms to the spherical contour of surface 56 in order to support male portion 52 for pivotal movement. Segment 60 is cylindrical in shape, at least its inner surface is cylindrical, for supporting male portion 52 for axial movement. Finally, segment 62 which defines the entry end of the female portion is conical in shape having a maximum inner diameter (entry diameter) greater than the outer diameter of male portion 52 for initially receiving the latter and guiding it into segments 58 and 60. In order to prevent falling debris from entering this widened segment, joint arrangement 30 may include a funnel cover 64 located concentrically around tubular section 26 just above male portion 52.

From the foregoing, it should be quite apparent that the two joint arrangements 28 and 30 allow tubular section 26 to expand and contract or otherwise move in an axial and pivotal way, at least to a limited extent, relative to upper tubular section 22 and lower tubular section 24. In this way, tubular pipe section 26 accepts thermal expansions and displacements of piping sections 22 and 24 without creating thermal stresses and its length can be optimized to minimize seismic stresses. In addition, the topmost stop flanges 50 comprising part of joint arrangement 28 serve to interlock top tubular section 22 with intermediate tubular section 26 so that the intermediate section including its female and male end portions can be readily removed from the sodium pool with section 22 for inspection. Also, the internal fluid pressure acts to provide sealing forces at joints 28 and 30. At joint 28, the internal pressure exerts an outward force on cylindrical sleeve 40, thereby creating a tight seal between the lower flange 46 and contour 36. At joint 30, an axial, unbalanced pressure force on tubular section 26 creates the seal between surface 56 of male portion 52 and the inner surface of segment 58. The unbalanced pressure force is created by making the inner diameter of cylindrical housing 38 at joint 28 sufficiently larger than the inner surface of segment 58 which conforms with the spherical contour of surface 56. Moreover, it should be apparent that the internal fluid pressure within each of the joints 28 and 30 respectively exerts an outward force against its associated male portion 32, 52. These internal pressure forces act to cause the respective male portions to expand, thereby improving the seal between their outer surfaces and the adjoining surfaces of their associated female portions. Should the pressure in either of these joints increase, sealing forces will increase to provide a tighter seal. In addition, it should be understood that the two joint arrangements do not have to provide perfect seals since the entire assembly is submerged within the pool of sodium and a limited amount of leakage through the joints can be tolerated.

Overall pipe coupling assembly 20 has been described as an all metal assembly because of its particular use within a pool of liquid metal in an LMFBR. This means that the tubular sections themselves are metal, preferably stainless steel, as well as all the components making up the two joint arrangements. However it is to be understood that the overall assembly as described above could be used in other environments including those which do not require all metal components and hence the components making up the coupling assembly could in this case be constructed of other suitable material.

What is claimed is:

1. A pipe coupling assembly especially suitable for fluid connecting together certain components submerged within a pool of liquid metal in a nuclear reactor, said assembly comprising a first tubular section having one end adapted for connection with one of said reactor components, a second tubular section having one end adapted for connection with another of said reactor components, a third intermediate tubular section and first and second joint arrangements for respectively connecting one end of said intermediate section with the otherwise free end of said first section and the opposite end of said intermediate section with the otherwise free end of said second section, said first joint arrangement forming the connecting ends of said first and intermediate sections and including a male portion having an outer partially spherical contour, an associated female portion including means interconnected with said male portion for providing limited axial and pivotal movement between said first and intermediate tubular sections and means for interlocking said male and female portions together, said interconnecting means including an outer cylindrical housing and a concentric inner cylindrical sleeve shorter in length than said outer housing and slidable within and against the inner surface of said housing along a longitudinal section of the latter, said housing and sleeve being positioned around their associated male portion for pivotal movement about the latter, said second joint arrangement forming the connecting ends of said second and intermediate sections and including a male portion having an outer partially spherical contour and an associated female portion including means supporting said last-mentioned male portion for pivotal movement.

2. An assembly according to claim 1 wherein said sleeve includes a pair of longitudinally spaced inwardly extending annular flanges each of which includes a bearing surface conforming in shape to and engaged slidably against said associated male portion.

3. An assembly according to claim 2 wherein the male portion of sand first joint is enlarged relative to the adjoining segment of its tubular section and wherein said interlocking means includes a stop flange connected to and extending inwardly from the inner surface of said outer housing at the outermost side of said inner sleeve, said stop flange preventing said housing, inner sleeve and last-mentioned male portion from separating from one another, whereby to interlock the latter with its associated female portion.

4. An assembly according to claim 3 wherein the female portion of said first joint arrangement includes seal means between said outer housing and said inner sleeve.

5. An assembly according to claim 4 wherein the female portion support means of said second joint arrangement includes a circumferential segment conforming to the spherical contour of its associated male portion to support the latter for pivotal movement, said last-mentioned female portion also including a longitudinally spaced conical segment adapted to initially receive the associated male portion and an intermediate cylindrical segment for supporting the latter for limited axial movement.

6. An assembly according to claim 1 wherein the female portion support means of said second joint arrangement includes a circumferential segment conforming to the spherical contour of its associated male portion to support the latter for pivotal movement.

7. An assembly according to claim 6 wherein said last-mentioned female portion also includes a longitudinally spaced conical segment adapted to initially receive its associated male portion and an intermediate cylindrical portion supporting the latter for limited axial movement.

8. An assembly according to claim 7 wherein said second pipe joint arrangement includes cover means extending around the male portion of said second joint arrangement for reducing the possibility of debris entering into associated female portion.

9. In an all metal pipe coupling assembly which includes a plurality of tubular sections and which is especially suitable for fluid connecting together certain components submerged within a pool of liquid metal in a nuclear reactor, a joint arrangement for connecting adjacent ends of two of said tubular sections, said arrangement forming the connecting ends of said tube sections and comprising a male portion having an outer partially spherical contour and an associated female portion including means supporting said male portion for limited axial and pivotal movement and means for interlocking said male and female portions together, said supporting means including an outer cylindrical housing and a concentric inner cylindrical sleeve shorter in length than said housing and slidable within and against the inner surface of said housing along a longitudinal section of the latter, said sleeve including a pair of longitudinally spaced, inwardly extending annular flanges which respectively include bearing surfaces conforming in shape to and engaged slidably against opposite sides of the outer spherical contour of said male portion for supporting the sleeve and outer housing for pivotal movement about said male portion.

10. A joint arrangement according to claim 9 wherein said male portion is enlarged relative to the adjoining segment of its tubular section and wherein said interlocking means includes a pair of stop flanges connected to and extending inwardly from the inner surface of said outer housing on opposite side of said inner sleeve, said stop flanges extending sufficiently inwardly to prevent said housing and male portion from separating from one another, and to limit said axial movement, whereby to interlock the latter with its associated female portion.

11. A joint arrangement according to claim 9 wherein one of said annular flanges is an integrally formed part of said sleeve and wherein the other of said flanges is formed separately from said sleeve but fixedly joined therewith.

12. In an all metal coupling assembly which includes a plurality of tubular sections and which is especially suitable for fluid connecting together certain components submerged within a pool of liquid metal in a nuclear reactor, a joint arrangement for connecting adjacent ends of two of said tubular sections, said arrangement forming the connecting ends of said two sections and comprising a male portion having an outer partially spherical contour and a female portion including a circumferential segment conforming to the spherical contour of said male portion for supporting the latter for pivotal movement, a longitudinally spaced conical segment adapted to initially receive said male portion and an intermediate cylindrical segment for supporting said male portion for limited axial movement.

* * * * *